United States Patent
Takemae et al.

(10) Patent No.: US 9,317,756 B2
(45) Date of Patent: Apr. 19, 2016

(54) LANE BOUNDARY MARKING LINE DETECTION DEVICE AND ELECTRONIC CONTROL DEVICE

(71) Applicant: TOYOTA JIDOSHA KABUSHIKI KAISHA, Toyota-shi, Aichi-ken (JP)

(72) Inventors: Yoshinao Takemae, Yokohama (JP); Kiyosumi Kidono, Nagakute (JP)

(73) Assignee: TOYOTA JIDOSHSA KABUSHIKA KAISHA, Aichi-ken (JP)

( * ) Notice: Subject to any disclaimer, the term of this patent is extended or adjusted under 35 U.S.C. 154(b) by 0 days.

(21) Appl. No.: 14/665,185

(22) Filed: Mar. 23, 2015

(65) Prior Publication Data

US 2015/0278613 A1 Oct. 1, 2015

(30) Foreign Application Priority Data

Mar. 27, 2014 (JP) ................. 2014-067140

(51) Int. Cl.
 *G06K 9/00* (2006.01)
 *G06K 9/46* (2006.01)
 *G06T 7/00* (2006.01)

(52) U.S. Cl.
 CPC .......... *G06K 9/00798* (2013.01); *G06K 9/4604* (2013.01); *G06K 9/4661* (2013.01); *G06T 7/0042* (2013.01)

(58) Field of Classification Search
 None
 See application file for complete search history.

(56) References Cited

U.S. PATENT DOCUMENTS

| 8,363,896 | B2 | 1/2013 | Tamura | |
| 8,611,609 | B2 * | 12/2013 | Oyama | G06K 9/00798 382/103 |
| 2012/0070088 | A1 * | 3/2012 | Yoshimi | G06T 7/0042 382/199 |
| 2012/0194677 | A1 * | 8/2012 | Suzuki | G06K 9/00798 348/148 |
| 2013/0202155 | A1 * | 8/2013 | Karanam | G06K 9/00798 382/104 |
| 2013/0272577 | A1 * | 10/2013 | Sakamoto | G08G 1/167 382/103 |
| 2014/0152829 | A1 * | 6/2014 | Suzuki | G08G 1/167 348/148 |
| 2015/0195500 | A1 * | 7/2015 | Usui | H04N 9/735 348/148 |

FOREIGN PATENT DOCUMENTS

JP 2012-022574 A 2/2012

OTHER PUBLICATIONS

Wijesoma et al., "Road Edge and Lane Boundary Detection using Laser and Vision", Proceedings of the 2001 IEEE/RSJ, International Conference on Intelligent Robots and Systems, Oct. 29-Nov. 3, 2001, vol. 3, pp. 1440-1445.
Ishino et al., "Extraction of Road Markings from Aerial Images", SICE Annual Conference 2008, Aug. 20-22, 2008, pp. 2180-2183.

* cited by examiner

*Primary Examiner* — Soo Park
(74) *Attorney, Agent, or Firm* — Sughrue Mion, PLLC

(57) ABSTRACT

A lane boundary marking line detection device includes an imaging device, a lane boundary detection unit, a lane boundary marking line search unit. The lane boundary detection unit detects first and second lane boundaries based on image information in an imaging area. The lane boundary marking line search unit searches for a lane boundary marking line on a road surface on a second lane boundary's side based on a position of the first lane boundary, sets search lines on the road surface on the second lane boundary's side based on shape information on the first lane boundary, and acquires search line brightness information based on the image information. When not determining that there is the search line that is most probable as the lane boundary marking line, the lane boundary marking line search unit does not select any of the search lines as the lane boundary marking line candidate line.

10 Claims, 13 Drawing Sheets

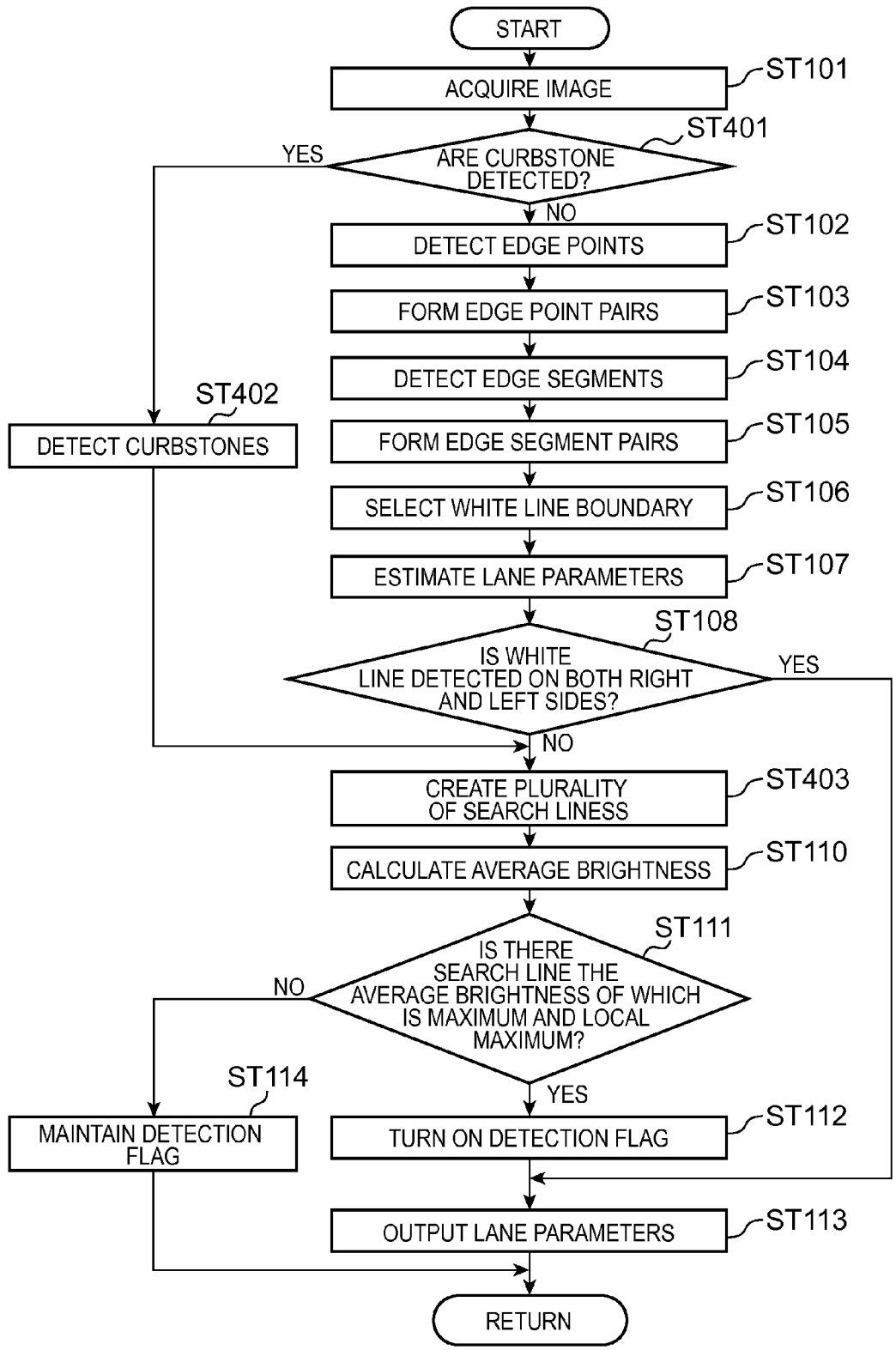

LANE BOUNDARY MARKING LINE DETECTION DEVICE AND ELECTRONIC CONTROL DEVICE

INCORPORATION BY REFERENCE

The disclosure of Japanese Patent Application No. 2014-067140 filed on Mar. 27, 2014 including the specification, drawings and abstract is incorporated herein by reference in its entirety.

BACKGROUND OF THE INVENTION

1. Field of the Invention

The present invention relates to a lane boundary marking line detection device and an electronic control device.

2. Description of Related Art

Recently, to increase the safety of vehicle travel and to support a driver in the driving operation, a device is available that captures the vehicle's surroundings with an imaging unit mounted on the vehicle and, based on the captured image information, recognizes the white lines in front of the vehicle for controlling the vehicle's travel. For example, the on-vehicle white line recognition device described in Japanese Patent Application Publication No. 2012-22574 (JP 2012-22574 A) detects the white lines, one on the right and the other on the left, based on the image in which the vehicle's lane is captured. If the reliability of one of the right white line and left white line is low, this on-vehicle white line recognition device offsets the high-reliability white line to the low-reliability white line side to correct the low-reliability white line. In this way, this on-vehicle white line recognition device can accurately recognize the white lines of the vehicle's lane even if a noise is detected when the vehicle approaches a branching road.

However, when one of the right white line and left white line cannot be recognized due to a scrape in the white line and, as a result, the other white line, which is recognized, is offset to the side on which the white line cannot be recognized, there is a possibility of incorrect correction. For example, if the detection reliability of one of the white lines is low in an area near a road branching point, the high-detection-reliability white line is offset to the side of the low-detection-reliability white line to correct the low-detection-reliability white line. In this case, however, if the high-detection-reliability white line is a white line that does not form a horizontal pair with the low-detection-reliability white line in the lane, this correction results in incorrect correction. That is, if the low-detection-reliability white line is corrected by offsetting the high-detection-reliability white line that does not form a horizontal pair in the lane, the shape of the corrected white line differs from the actual shape of the low-detection-reliability white line. Thus, when the low-detection-reliability white line is corrected by offsetting the high-detection-reliability white line, there is a possibility that the estimated shape of the low-detection-reliability white line is different from the actual shape of the white line.

SUMMARY OF THE INVENTION

The present invention provides a lane boundary marking line detection device and an electronic control device that can reduce the possibility of incorrect detection.

A lane boundary marking line detection device according to a first aspect of the invention includes an imaging device, a lane boundary detection unit, and a lane boundary marking line search unit. The imaging device is configured to capture an area in front of a vehicle. The lane boundary detection unit is configured to detect a first lane boundary and a second lane boundary based on image information in an imaging area captured by the imaging device. The first lane boundary and the second lane boundary are positioned on a road surface on which the vehicle travels. The second lane boundary is positioned on the road surface on an opposite side of the first lane boundary across the vehicle in a vehicle width direction. The lane boundary marking line search unit is configured to search for a lane boundary marking line on the road surface on the opposite side based on a position of the first lane boundary. The lane boundary marking line search unit is configured to set search lines on the road surface on the opposite side based on shape information on the first lane boundary, the search lines being positioned at positions different from each other in the vehicle width direction in the lane. The lane boundary marking line search unit is configured to acquire search line brightness information based on the image information, the search line brightness information being brightness information on each of the search lines. The lane boundary marking line search unit is configured to determine, by comparing the search line brightness information of the search lines with each other, whether there is the search line that is one of the search lines and is most probable as the search line used as a lane boundary making line candidate. The lane boundary marking line search unit is configured to, when it is determined that there is the search line that is most probable as the lane boundary marking line, select the search line as a lane boundary marking line candidate line. The lane boundary marking line search unit is configured not to, when it is not determined that there is the search line that is most probable as the lane boundary marking line, select any of the search lines as the lane boundary marking line candidate line.

The lane boundary marking line detection device in the first aspect of the present invention reduces the possibility of incorrect detection.

In the first aspect of the invention, the lane boundary marking line search unit may be configured to set the search lines based on shape information on a solid lane boundary positioned at an end of the road surface on which the vehicle travels, in the vehicle width direction.

In the first aspect of the invention, the lane boundary marking line search unit may be configured to divide each of the search lines into a plurality of areas in an extending direction of the search lines and to determine whether there is the search line that is most probable as the lane boundary marking line candidate line in each of the areas. The lane boundary marking line search unit may be configured to, when a vehicle-width-direction distance between the search lines of areas neighboring in the extending direction is in a predetermined range, group the search lines of the areas neighboring in the extending direction into one lane boundary marking line candidate, each of the search lines being selected in a corresponding one of the areas as the lane boundary marking line candidate line.

An electronic control device according to a second aspect of the invention includes a lane boundary detection unit and a lane boundary marking line search unit. The lane boundary detection unit is configured to detect a first lane boundary and a second lane boundary based on image information on an area in front of a vehicle. The first lane boundary and the second lane boundary are positioned on a road surface on which the vehicle travels. The second lane boundary is positioned on the road surface on an opposite side of the first lane boundary across the vehicle in a vehicle width direction. The lane boundary marking line search unit is configured to search for a lane boundary marking line on the road surface on the opposite side based on a position of the first lane boundary. The lane boundary marking line search unit is configured to set search lines on the road surface on the opposite side based on shape information on the first lane boundary, the search lines being positioned at positions different from each other in the vehicle width direction in the lane. The lane boundary marking line search unit is configured to acquire search line brightness information based on the image information, the search line brightness information being brightness information on each of the search lines. The lane boundary marking line search unit is configured to select a search line having a maximum value and a local maximum value of average brightness among the search lines as a lane boundary marking line candidate line based on the search line brightness information. The lane boundary marking line search unit is configured not to, when there is not the search line having the maximum value and the local maximum value of average brightness, select any of the search lines as the lane boundary marking line candidate line.

The lane boundary marking line detection device in the second aspect of the present invention reduces the possibility of incorrect detection.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 19 is a flowchart showing the processing procedure for setting search lines based on curbstones.

DETAILED DESCRIPTION OF EMBODIMENTS

An embodiment of a lane boundary marking line detection device of the present invention will be described in detail below with reference to the drawings. The embodiment below is not intended to limit the scope of the present invention. Elements described in the embodiment include their variations that can be replaced, or readily replaced, by those skilled in the art and substantially equivalent elements.

Embodiment

Figure 1:
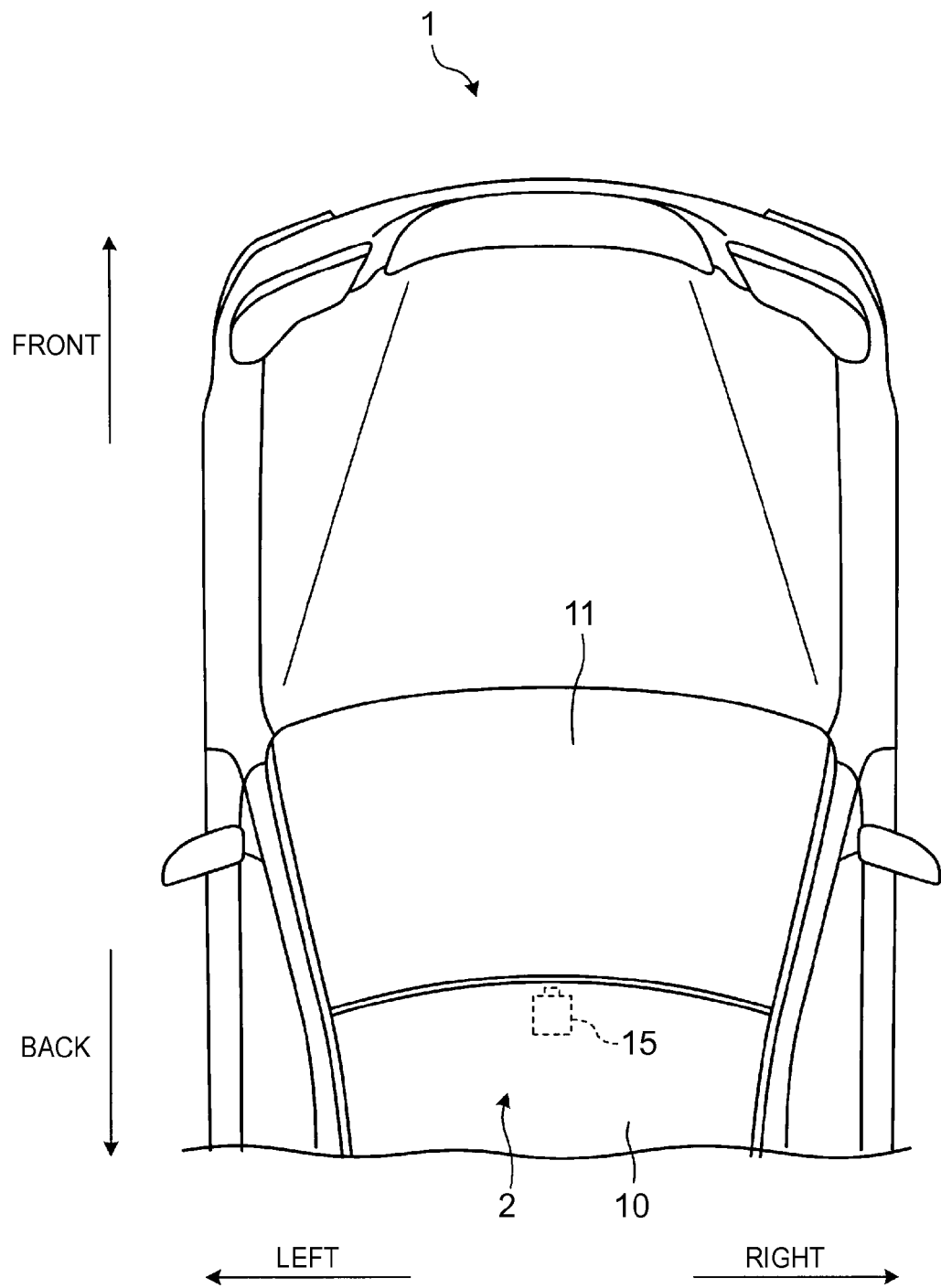
FIG. 1 is a top view of a vehicle on which a lane boundary marking line detection device in an embodiment of the present invention is mounted.
Figure 2:
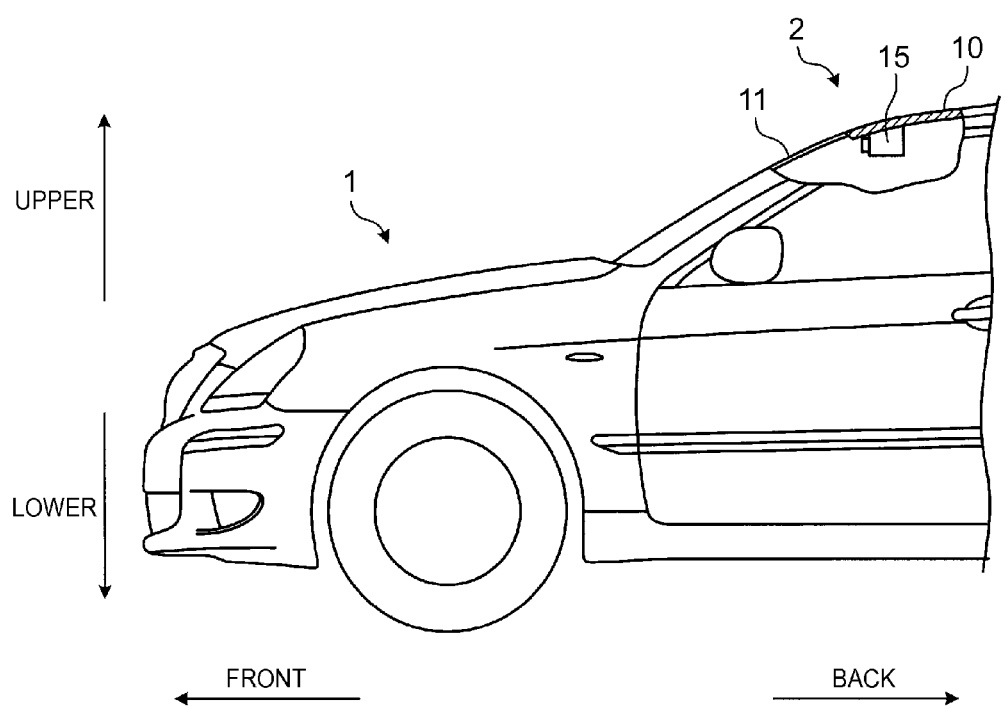
FIG. 2 is a side view of the vehicle shown in FIG. 1.

FIG. 1 is a top view of a vehicle on which the lane boundary marking line detection device in the embodiment is mounted. FIG. 2 is a side view of the vehicle shown in FIG. 1. In the description below, the front-back direction of a vehicle 1 on which a lane boundary marking line detection device 2 is mounted is also the front-back direction of the lane boundary marking line detection device 2. The right-left direction of the vehicle 1, i.e., the vehicle-width direction, is also the right-left direction of the lane boundary marking line detection device 2. The upper-lower direction of the vehicle 1 is also the upper-lower direction of the lane boundary marking line detection device 2.

The lane boundary marking line detection device 2 in this embodiment includes a camera 15 configured to capture the front area of the vehicle 1. This camera 15 is installed inside the vehicle. For example, the camera 15, installed on the interior side of a roof 10 of the vehicle 1, is oriented in the direction to capture the front area. The camera 15, mounted in this manner, captures the front area via a windshield 11 to capture the white lines and other vehicles on the road. The white lines mentioned here refer to the lane boundary marking lines that indicate the boundary of the lane in which the vehicle 1 travels. The lane boundary marking line in this case is not limited to a white line but includes any line, such as an orange line, that indicates a boundary in the vehicle-width direction in the lane in which the vehicle 1 travels. The orange line on the road indicates the prohibition of boundary line crossing for passing other vehicles.

Figure 3:
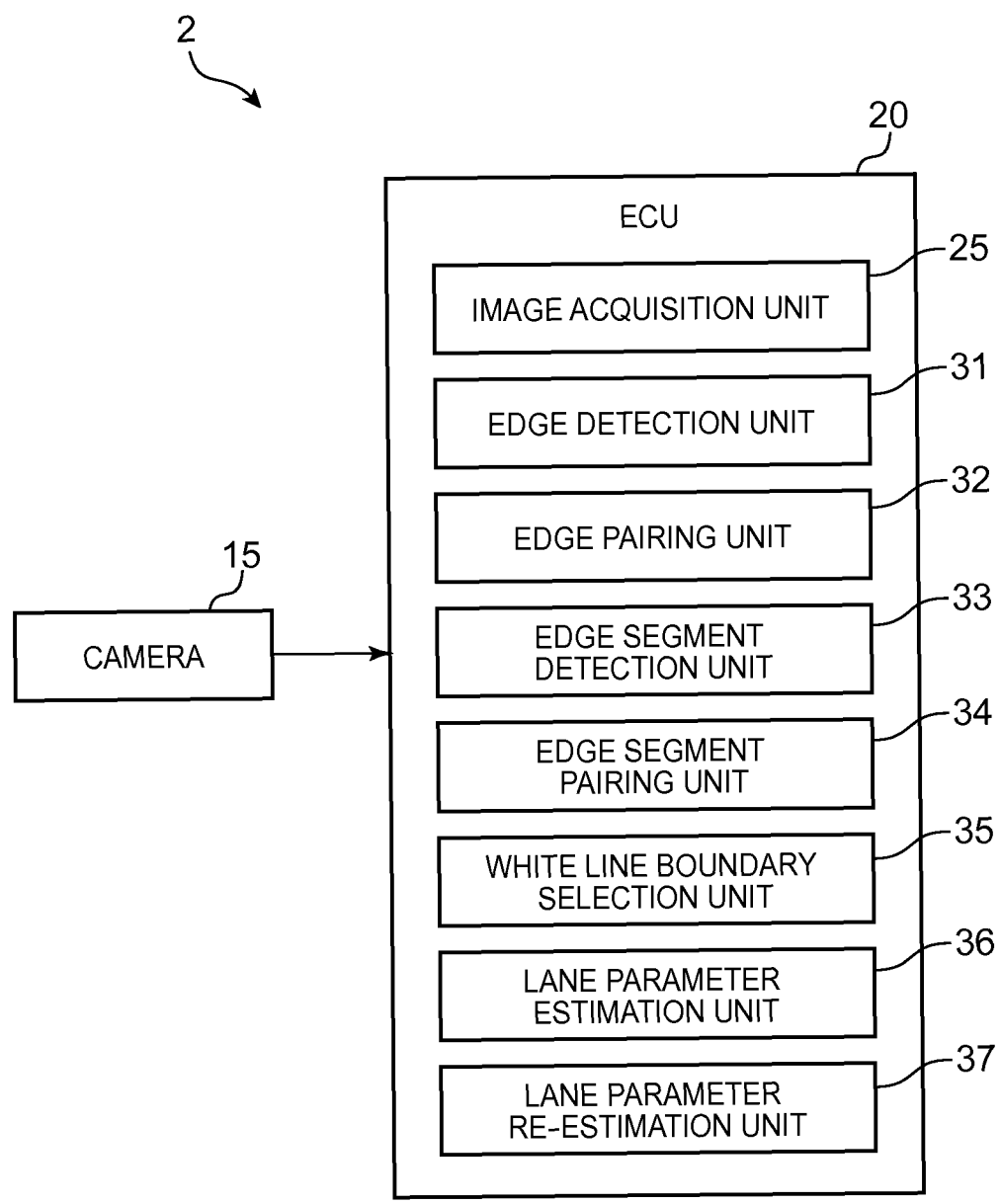
FIG. 3 is a diagram showing a main part configuration of the lane boundary marking line detection device in the embodiment of the present invention.

FIG. 3 is a diagram showing a main part configuration of the lane boundary marking line detection device in the embodiment. The camera 15 is mounted on the vehicle 1 and is connected to an Electronic Control Unit (ECU) 20 configured to control the components of the vehicle 1. The hardware configuration of the ECU 20 includes a processing unit, which has the Central Processing Unit (CPU), and a storage unit that has a Random Access Memory (RAM) and other memories. This configuration is a known configuration and, therefore, the description is omitted here.

The processing unit of the ECU 20 functionally includes an image acquisition unit 25, an edge detection unit 31, an edge pairing unit 32, an edge segment detection unit 33, an edge segment pairing unit 34, a white line boundary selection unit 35, a lane parameter estimation unit 36, and a lane parameter re-estimation unit 37. The ECU 20 may be thought of as a boundary marking line detection device configured to detect the white lines, which indicate the boundary of the lane in which the vehicle 1 travels, based on the image captured by the camera 15. The ECU 20 is also thought of as a lane boundary detection device configured to detect the lane boundary, which indicates the boundary of the lane in which the vehicle 1 travels, based on the image captured by the camera 15. The lane boundary in this case includes not only a lane boundary marling line marked on the road such as a white line but also an object that indicates the lane boundary with a solid shape such as the shoulder of a road, a guardrail, and a side wall.

The image acquisition unit 25, one of the components of the ECU 20, is configured to acquire an image captured by the camera 15. The edge detection unit 31 is configured to detect an edge, which is a part where the brightness of an image greatly changes, from an image acquired by the image acquisition unit 25. The edge detection unit 31 scans an image, acquired by the image acquisition unit 25, in one direction to detect a rising edge where the brightness increases and a falling edge where the brightness decreases. The edge pairing unit 32 is configured to detect edge pairs, each of which is a pair of a rising edge and a falling edge, based on the information about the width between a rising edge and a falling edge detected by the edge detection unit 31 and the information about the brightness.

The edge segment detection unit 33 is configured to detect an edge segment that is a line arranged linearly for the rising edges and for the falling edges. The edge segment pairing unit 34 is configured to detect pairs each of which is a pair of a rising edge segment and a falling edge segment detected by the edge segment detection unit 33. The white line boundary selection unit 35 is configured to select a segment, which is near to a white line detection position in the past, as the white line of the lane in which the vehicle travels, based on the edge segment pairs detected by the edge segment pairing unit 34. In this way, the white line boundary selection unit 35, which selects the white lines of the lane in which the vehicle travels, is provided as a lane boundary detection unit that detects the lane boundary on the road surface on which the vehicle travels, based on the image information in the imaging area captured by the camera 15.

The lane parameter estimation unit 36 is configured to estimate the parameters that represent the road shape. The lane parameter re-estimation unit 37 is configured to search for one of the white lines on both right and left sides of the lane in which the vehicle travels, using the detection result of the other white line that is already detected. In other words, the lane parameter re-estimation unit 37 is provided as a lane boundary marking line search unit. Based on the position of a lane boundary that is detected by the white line boundary selection unit 35 and is one of the lane boundaries on both sides of the vehicle 1, this lane boundary marking line search unit searches for a lane boundary marking line that is on the road surface on the opposite side of the one of the lane boundaries in the vehicle width direction across the vehicle 1.

The lane boundary marking line detection device 2 in this embodiment, configured as described above, performs the following operation. The lane boundary marking line detection device 2 captures the front area of the vehicle 1 with the camera 15 via the windshield 11 to support the driver in driving during the travel of the vehicle 1. The driving support includes the control operation for detecting the lane in which the vehicle is to travel and for assisting the driver in the driving operation so that the vehicle travels along the lane. To perform the driving support control, the lane boundary marking line detection device 2 recognizes the lane, in which the vehicle travels, by detecting the white lines based on the image captured by the camera 15 and performs auxiliary control operation for turning so that the vehicle travels along the recognized lane.

Figure 4:
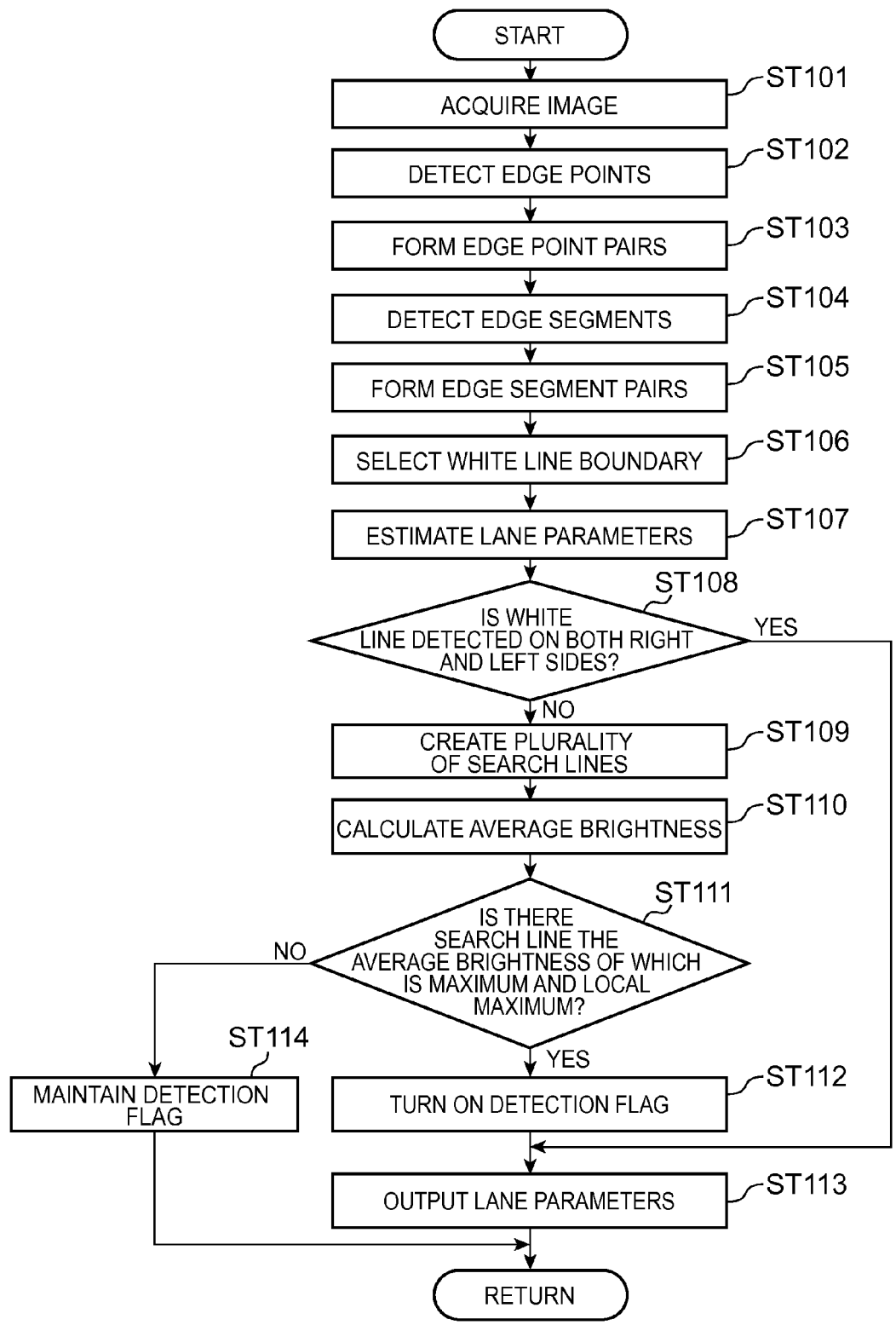
FIG. 4 is a flowchart showing the processing performed by the lane boundary marking line detection device in the embodiment of the present invention to detect white lines.
Figure 5:
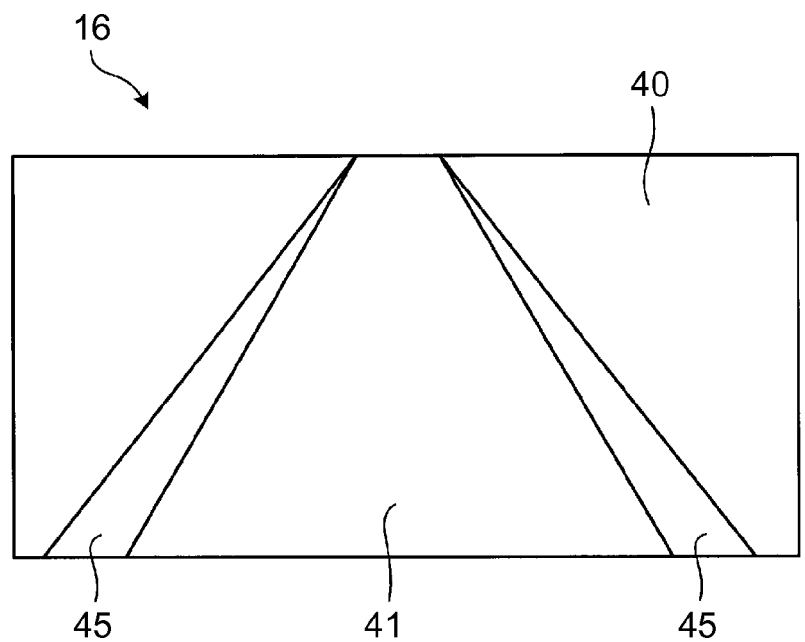
FIG. 5 is a diagram showing an example of an image captured by a camera.

Next, the processing procedure performed by the lane boundary marking line detection device 2 for detecting white lines is described below. FIG. 4 is a flowchart showing the processing performed by the lane boundary marking line detection device in this embodiment for detecting white lines. FIG. 5 is a diagram showing an example of an image captured by the camera. During the travel of the vehicle 1, the ECU 20 acquires an image 16 captured by the camera 15 (step ST101). That is, during the travel of the vehicle 1, the camera 15 captures the area in front of the vehicle via the windshield 11 and the image acquisition unit 25 of the ECU 20 acquires the captured image 16. As a result, a road 40 on which the vehicle travels, including a lane 41 and white lines 45, is captured as shown in FIG. 5.

Figure 6:
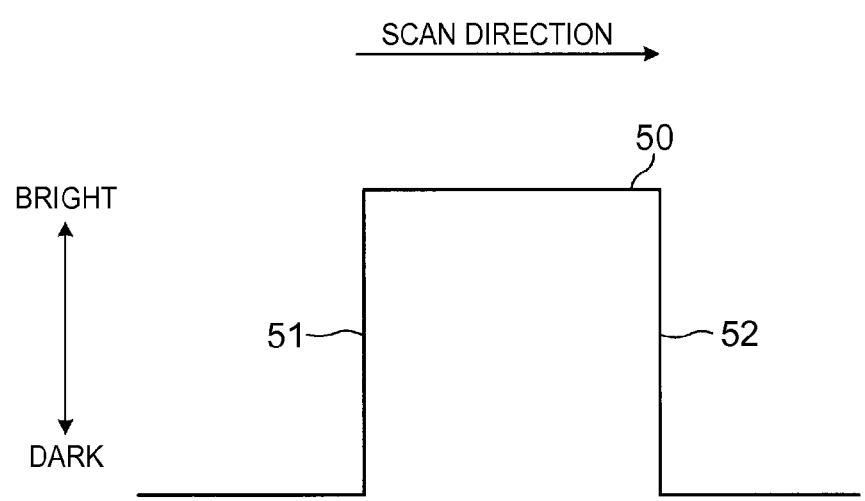
FIG. 6 is a diagram showing edges.

Next, the ECU 20 detects edge points (step ST102). FIG. 6 is a diagram showing edges. The lane boundary marking line detection device 2 in this embodiment detects the white lines 45 on the road 40 based on the image 16 acquired by the image acquisition unit 25. The white lines 45 are acquired by the following method. The edge detection unit 31 of the ECU 20 detects brightness 50 in the image 16 by scanning the image 16 horizontally, that is, in the vehicle width direction of the vehicle 1, and detects an edge that is a part where the brightness 50 changes in the image 16. More specifically, the edge detection unit 31 uses a Sobel filter to detect a rising edge 51 and a falling edge 52. The rising edge 51 is a part where the brightness 50 changes from dark to bright, and the falling edge 52 is a part where the brightness 50 changes from bright to dark. In this manner, the ECU 20 detects the white lines 45 by detecting the rising edge 51 and the falling edge 52 in the image 16 acquired by the image acquisition unit 25.

Figure 7:
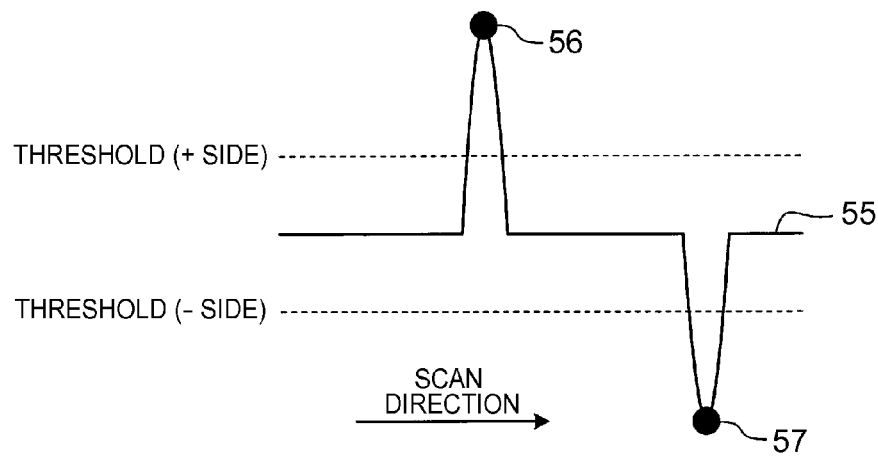
FIG. 7 is a diagram showing an edge point.

FIG. 7 is a diagram showing an edge point. The specific method for detecting the rising edge 51 and the falling edge 52 is as follows. The edge detection unit 31 scans the acquired image 16 while observing a change in the brightness 50 and detects an edge in the image 16 by detecting an edge point where the brightness 50 greatly changes in the image 16.

For example, when the image 16 is scanned from left to right, the brightness 50 changes as follows when scanning over the white line 45 on the road 40. At the left end of the white line 45, the scanning is performed from the road surface, where there is no white line 45, toward the white line 45. Therefore, the brightness 50 of a position near the left end of the white lines 45 changes from low to high. In the part of the white line 45 where the brightness 50 changes in this manner, a brightness change line 55, which indicates a change in the brightness derived using a differential filter such as the Sobel filter, rises at the position where the left end of the white lines 45 is positioned.

When the image 16 is scanned from left to right and the scan point reaches the right end of the white line 45, the scanning is performed from the white line 45 to the road surface where there is no white line 45 and, at this point, the brightness 50 changes from high to low. Therefore, the brightness change line 55 falls at the position where the right end of the white lines 45 is positioned.

The edge detection unit 31 compares the value of the brightness change line 55, which indicates a change in the brightness 50 as described above, with a predetermined threshold. If the absolute value of the strength at the peak of the brightness change line 55 is equal to or larger than the absolute value of the threshold, the edge detection unit 31 detects that part as an edge point. That is, the threshold is set in the rising side (+ side) of the brightness change line 55 and in the falling side (− side) of the brightness change line 55. The edge detection unit 31 compares the peak of the brightness change line 55 in the bright side with the threshold in the + side, and the peak of the brightness change line 55 in the dark side with the threshold in the − side. The peak of the brightness change line 55 determined equal to or larger than the threshold in the + side as a comparison of this comparison is detected as a rising edge point 56. Similarly, the peak of the brightness change line 55 determined equal to or smaller than the threshold in the − side is detected as a falling edge point 57.

Figure 8:
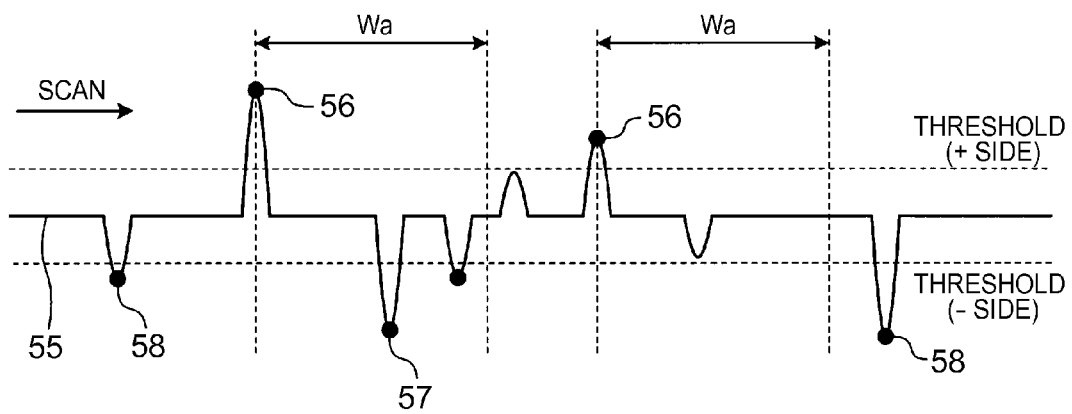
FIG. 8 is a diagram showing edge point pairing and unnecessary edge points.

Next, the edge pairing unit 32 of the ECU 20 forms a pair of edge points (step ST103). FIG. 8 is a diagram showing edge point pairing and unnecessary edge points. The edge detection unit 31 detects edge points not only in an area near the white line 45 but also in the entire part of the image 16 acquired by the image acquisition unit 25. This means that the detected edge points sometimes include edge points not related to the white line 45 such as edge points caused by a stain on the road surface. Therefore, the edge pairing unit 32 forms a pair of edge points to eliminate the edge points not related to the white line 45. That is, when the white line 45 is detected from the image 16 acquired by the image acquisition unit 25, there are normally pairs each composed of the rising edge 51 and falling edge 52. Considering this fact, the edge pairing unit 32 determines an isolated edge point, which does not form a pair with another edge point, as an unnecessary edge point 58 and removes such an edge point.

More specifically, the edge pairing unit 32 detects a pair of edge points as follows. If the distance between the rising edge point 56 and the falling edge point 57, both of which are detected by the edge detection unit 31, is equal to or smaller than the supposed width Wa of the white line 45, the edge pairing unit 32 detects the rising edge point 56 and the falling edge point 57 as a pair. That is, because the width of the white line 45 on the road 40 is predetermined, the storage unit of the ECU 20 stores in advance the width Wa (with some margin) of the white line 45 that is supposed on the image 16 acquired by the image acquisition unit 25. Therefore, when scanning the image 16 from left to right, the edge pairing unit 32 detects the rising edge point 56 and the falling edge point 57 as a pair if the falling edge point 57 is positioned within the range of the supposed width Wa of the white line 45 that begins at the position of the detected rising edge point 56.

If there are the rising edge point 56 and the falling edge point 57 but if the distance between them is larger than the supposed width Wa of the white line 45, the edge pairing unit 32 removes one of the edge points as the unnecessary edge point 58. That is, if there are the rising edge point 56 and the falling edge point 57 when scanning the image 16 from left to right but if the falling edge point 57 is positioned on the right side of the supposed width Wa of the white line 45 that begins at the position of the detected rising edge point 56, the edge pairing unit 32 determines this falling edge point 57 as the unnecessary edge point 58 and removes it.

The edge pairing unit 32 performs the processing described above to detect pairs of the rising edge point 56 and the falling edge point 57 in the image 16 acquired by the image acquisition unit 25. Each of these pairs corresponds to the rising edge 51 and the falling edge 52 that are determined to form a line that looks like the white line 45.

Next, the edge segment detection unit 33 detects an edge segment (step ST104). That is, the edge segment detection unit 33 detects an edge segment from the rising edges 51 and the falling edges 52 in the image 16 each of which corresponds to a pair of the rising edge point 56 and the falling edge point 57 detected by the edge pairing unit 32. That is, from the rising edges 51 each corresponding to the rising edge point 56 in the image 16 and from the falling edges 52 each corresponding to the falling edge point 57 in the image 16, the edge segment detection unit 33 of the ECU 20 detects an edge segment for rising edges 51 and for falling edges 52. The edge segment mentioned here refers to a segment that is linearly arranged. The edge segment detection unit 33 performs the Hough transform processing to detect an edge segment for the rising edges 51 and the falling edges 52 respectively.

Next, the edge segment pairing unit 34 forms a pair of edge segments (step ST105). That is, based on the degree of parallelism and the distance between an edge segment of the rising edges 51 and an edge segment of the falling edges 52 (these edge segments are those detected by the edge segment detection unit 33), the edge segment pairing unit 34 of the ECU 20 extracts pairs each composed of an edge segment of the rising edges 51 and an edge segment of the falling edges 52. By performing the processing described above, the edge segment pairing unit 34 extracts pairs each of which is determined to form a line that looks like the white line 45 and is composed of an edge segment of the rising edge 51 and an edge segment of the falling edge 52.

Next, the white line boundary selection unit 35 of the ECU 20 selects a white line boundary (step ST106). The white line boundary selection unit 35 compares the detection position of the white line 45 in the past with the detection position of a pair of edge segments of the rising edge 51 and the falling edge 52 extracted by the edge segment pairing unit 34. If the detection position of one of the edge segment pairs is near to the detection position of the white line 45 in the past, the white line boundary selection unit 35 selects and detects the edge segment pair as the white line 45 marked on the road 40 on which the vehicle is traveling.

Next, the lane parameter estimation unit 36 of the ECU 20 estimates the lane parameters (step ST107). That is, based on the detection position of the white line 45, selected by the white line boundary selection unit 35, and the shape of the detected white line 45, the lane parameter estimation unit 36 estimates the lane parameters using the least squares method and the Karman filter. These lane parameters are the parameters for the curvature and the lateral position representing the shape of the road 40 on which the vehicle travels. That is, the lane parameter estimation unit 36 estimates the lane parameters based on the shape information about the white line 45 that is a lane boundary. The lane parameter estimation unit 36 estimates the lane parameters for each of the white lines 45 on the right side and the left side of the lane 41 in which the vehicle travels. The estimated lane parameters include the curvature, a change in the curvature, and so on.

The storage unit of the ECU 20 includes detection flags each of which indicates the detection state of the lane parameters. This detection flag is turned on when the lane parameter estimation unit 36 estimates the lane parameters. The detection flag is provided for the lane parameters estimated for each of the white lines 45 positioned on the right side and the left side of the lane 41 in which the vehicle travels. Each detection flag is turned on and off according to the estimation state of the lane parameters for the corresponding white line 45.

Next, the ECU 20 determines whether the white line 45 is detected on both right side and left side (step ST108), based on the detection flag that indicates the detection state of lane parameters. That is, if both of the detection flags corresponding to the right and left white lines 45 of the lane 41 are on, it is determined that both right and left white lines 45 are detected. If at least one of the detection flags is off, it is determined that the white line 45 is not detected on both right and left sides.

Figure 9:
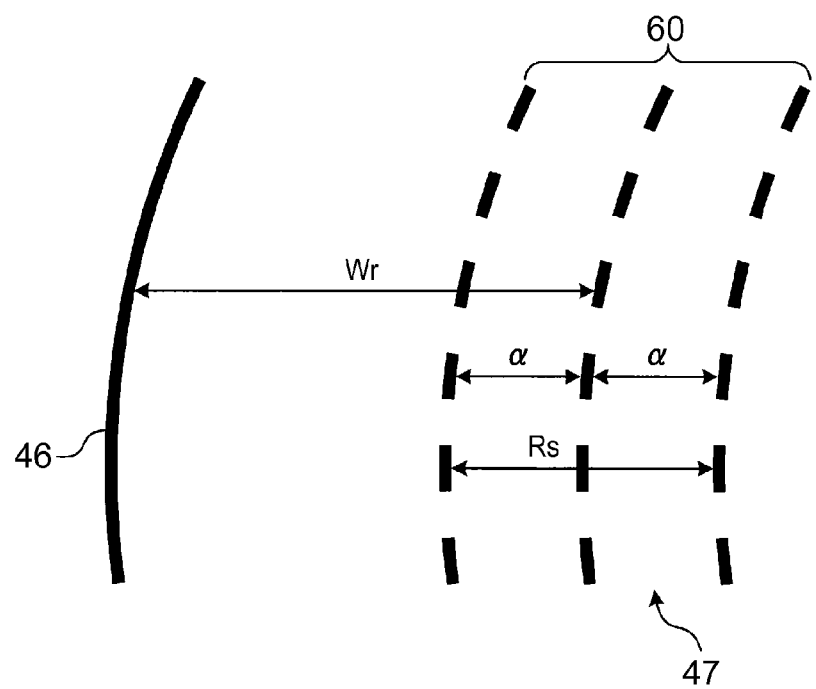
FIG. 9 is a diagram showing a search range.
Figure 10:
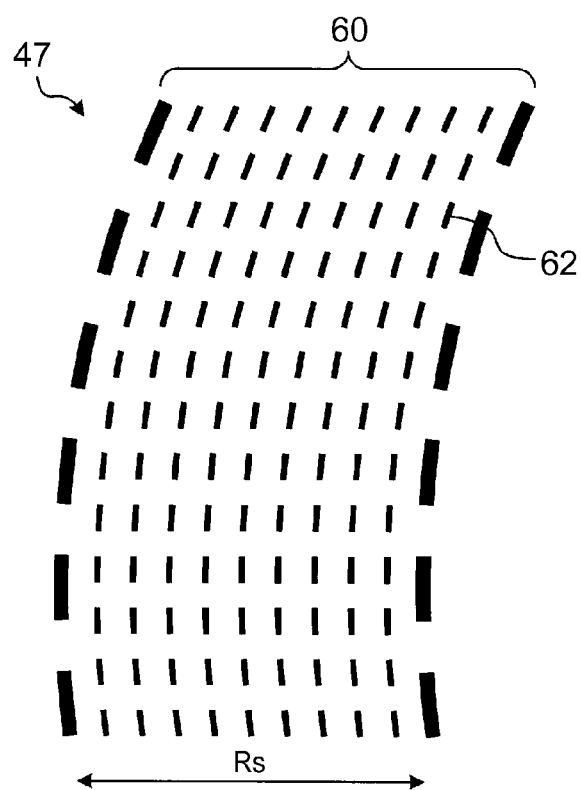
FIG. 10 is a diagram showing search lines.

If the determination result indicates that the white line 45 is not detected on both right side and the left side (No in step ST108), the ECU 20 creates a plurality of search lines 62 (step ST109). FIG. 9 is a diagram showing a search range. FIG. 10 is a diagram showing search lines. The ECU 20 re-estimates the white line 45, which cannot be detected, using the white line 45 that can be detected. To re-estimate the white line 45 that cannot be detected, a plurality of search lines 62, which are positioned at horizontally different positions in the lane, is set around a position where the white line 45 that cannot be detected is supposed to be positioned.

The lane parameter re-estimation unit 37 of the ECU 20 sets these search lines 62. If the detection reliability of one of the white lines 45 on the right and left sides of the lane 41 is low when the white lines 45 are detected based on the image 16 acquired by the image acquisition unit 25, the lane parameter re-estimation unit 37 sets the search lines 62 at a position where the low detection-reliability white line 45 is supposed to be positioned. The reliability mentioned here refers to the probability indicating whether there is a lane boundary, such as the white line 45, at the detected position. That is, "high reliability" in the description below indicates the state in which the probability that there is a lane boundary at the detected position is high and "low reliability" indicates the state in which the probability that there is a lane boundary at the detected position is low.

The lane parameter re-estimation unit 37 sets a plurality of search lines 62, the positions of which in the lane differ from each other in the vehicle width direction, at positions on the road surface on the side where the detection reliability of the white line 45 is low in the vehicle width direction, based on the shape information about the white line 45 on the side where the detection reliability of the white line 45 is low. More specifically, the lane parameter re-estimation unit 37 sets the search lines 62, not on the side where a high-reliability white line 46 is positioned, but on the side where a low-reliability white line 47 is positioned, in the horizontal direction of the lane 41. The high-reliability white line 46 is the white line 45 on the high detection-reliability side and is treated as a high-reliability lane boundary marking line, and the low-reliability white line 47 is the white line 45 on the low detection-reliability side and is treated as a low-reliability lane boundary marking line. The plurality of search lines 62 are set at horizontally different positions in the lane.

More specifically, the lane parameter re-estimation unit 37 first sets a search range 60, in which the low-reliability white line 47 is searched for, based on the lane parameters estimated using the high-reliability white line 46. To set the search range 60, the lane parameter re-estimation unit 37 sets a white line search range Rs as the search range 60. This white line search range Rs is a range beginning at the position, determined by shifting the position of the high-reliability white line 46 to the low-reliability white line 47 side by the lane width Wr and then shifting that position in the direction closer to the high-reliability white line 46 by (lane width Wr×α), and ending at the position determined by shifting the position of the high-reliability white line 46 to the low-reliability white line 47 side by the lane width Wr and then shifting that position in the direction away from the high-reliability white line 46 by (lane width Wr×α).

In this case, it is desirable that the value of the legally-defined width of the lane 41 or the value of the width commonly used as the width of the lane 41 be used as the lane width Wr. As another method for setting the lane width Wr, it is also desirable that the lane width, which is detected when the white lines 45 on both right and left sides of the lane 41 are detected with high reliability, be stored for use as the latest value of the lane width or that the average value of a plurality of lane widths be used. It is also desirable that an arbitrary the value of cc, which is used to calculate the white line search range Rs, be determined based on the detection accuracy of the white lines 45 detected by the lane boundary marking line detection device 2.

After the search range 60 is set as described above, the lane parameter re-estimation unit 37 sets a plurality of lines, horizontally spaced from each other with a predetermined resolution, within the search range 60 according to the performance of the camera 15. The plurality of lines, which are set in this manner, is set as the search lines 62. As a result, the plurality of almost-parallel search lines 62 is set at horizontally different positions in the search range 60.

Figure 11:
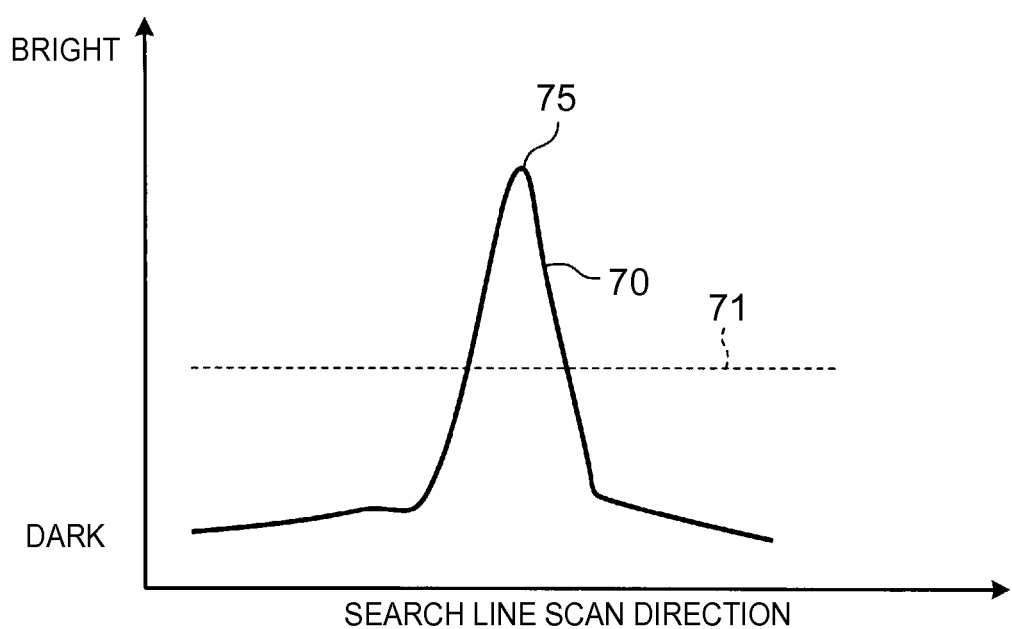
FIG. 11 is a diagram showing the average brightness of search lines.

Next, the lane parameter re-estimation unit 37 of the ECU 20 calculates average brightness 70 of the search lines 62 (step ST110). FIG. 11 is a diagram showing the average brightness of search lines. The lane parameter re-estimation unit 37 acquires the search line brightness information, which is the brightness information on each of the plurality of search lines 62 in the search range 60, based on the image 16 acquired by the image acquisition unit 25 and, for each of the horizontal positions in the width direction of the white line 45, calculates the average value of the brightness of the search line 62. In this way, the lane parameter re-estimation unit 37 calculates the average brightness 70 of the search line 62 at each of the horizontal positions in the image 16 acquired by the image acquisition unit 25 or in the range of a predetermined distance in the vehicle's traveling direction.

The brightness is added as follows when the average brightness 70 of the search line 62 is calculated. For example, the brightness may be added for each horizontal position by adding the brightness on a pixel basis in the horizontal direction of the image 16 or by adding the brightness of the brightest pixel in the range of a predetermined horizontal width according to the distance from the vehicle.

Next, the lane parameter re-estimation unit 37 determines whether there is the search line 62 the average brightness 70 of which is the maximum and the local-maximum (step ST111). That is, the lane parameter re-estimation unit 37 determines whether there is the search line 62 which is one of the search lines 62 and the average brightness 70 of which is the maximum and, at the same time, the local maximum.

To determine whether there is such a search line 62, the lane parameter re-estimation unit 37 first calculates the average brightness 70 of each of the search lines 62 as described above. After that, the lane parameter re-estimation unit 37 calculates an average brightness maximum value 75 that is the maximum value of the average brightness 70 as a result of comparison among the average brightness 70 when the average brightness 70 of the surrounding search lines 62 is increasing and then determines whether the calculated average brightness maximum value 75 is the local maximum. The following describes the processing procedure for determining whether there is such a search line 62.

Figure 12:
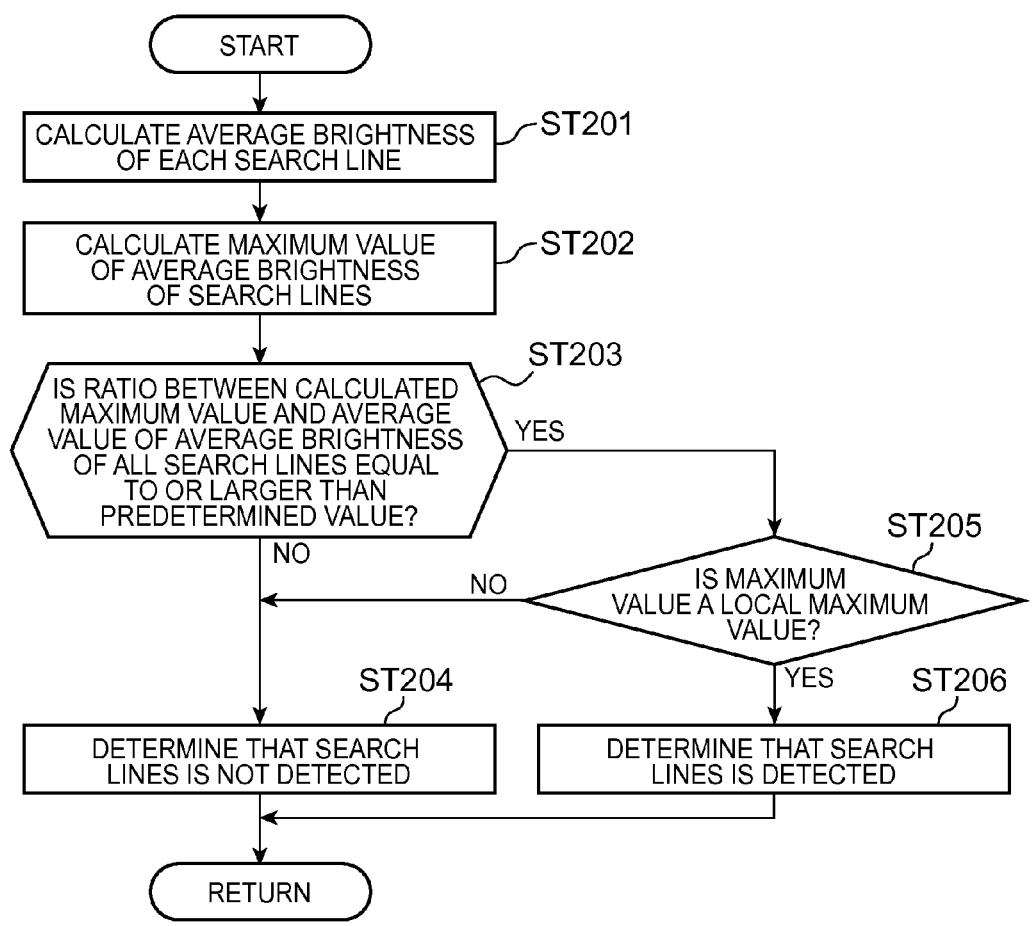
FIG. 12 is a flowchart showing the processing procedure for determining whether there is a search line the average brightness of which is the maximum and the local maximum.

FIG. 12 is a flowchart showing the processing procedure for determining whether there is a search line the average brightness of which becomes the maximum and the local maximum. To determine whether there is the search line 62 the average brightness 70 of which is the maximum and the local maximum, the lane parameter re-estimation unit 37 first calculates the average brightness 70 of each search line 62 in step ST110 (step ST201) and, after that, calculates the maximum value of the average brightness 70 of the search lines 62 (step ST202). That is, the lane parameter re-estimation unit 37 compares the average brightness 70 among the search lines 62 and, from those values of the average brightness 70, calculates the average brightness maximum value 75 that is the average brightness 70 with the maximum brightness value.

Next, the lane parameter re-estimation unit 37 determines whether the ratio between the calculated maximum value and the average value of the average brightness 70 of all search lines 62 is equal to or larger than a predetermined value (step ST203). That is, the lane parameter re-estimation unit 37 calculates an average brightness average value 71, which is the average value of the average brightness 70 of all search lines 62 for which the average brightness 70 is calculated, and determines whether the ratio between the average brightness maximum value 75 and the average brightness average value 71 is equal to or larger than the predetermined value. It is desirable to set an arbitrary value for the ratio between the average brightness maximum value 75 and average brightness average value 71, which is used for this determination, based on the detection accuracy with which the lane boundary marking line detection device 2 detects the white line 45.

If it is determined as a result of this determination that the ratio between the average brightness maximum value 75 and average brightness average value 71 is not equal to or larger than the predetermined value (No in step ST203), the lane parameter re-estimation unit 37 determines that the search line 62 satisfying this condition is not detected (step ST204) and then exits this processing procedure.

On the other hand, if it is determined that the ratio between the average brightness maximum value 75 and the average brightness average value 71 is equal to or larger than the predetermined value (Yes in step ST203), the lane parameter re-estimation unit 37 next determines whether the average brightness maximum value 75 is the local maximum value (step ST205). That is, the search range 60 sometimes includes a plurality of average brightness maximum values 75 in the average brightness 70 of the plurality of search lines 62 due to a scrape in the paint or a stain on the road surface. In such a case, the ratio between the plurality of average brightness maximum values 75 and the average brightness average value 71 is equal to or larger than the predetermined value. Therefore, the lane parameter re-estimation unit 37 determines whether the calculated average brightness maximum value 75 is the local maximum of the average brightness 70 that, among the values of the average brightness 70, is the only average brightness maximum value 75 with the ratio of its value to the average brightness average value 71 equal to or larger than the predetermined value.

If it is determined as a result of this determination that the average brightness maximum value 75 is not the local maximum (No in step ST205), the lane parameter re-estimation unit 37 determines that the search line 62, with the brightness of the average brightness maximum value 75 that, among the values of the average brightness 70, is the only average brightness maximum value 75 with the ratio of its value to the average brightness average value 71 equal to or larger than the predetermined value, is not detected (step ST204) and then exits this processing procedure.

On the other hand, if it is determined that the average brightness maximum value 75 is the local maximum (Yes in step ST205), the lane parameter re-estimation unit 37 determines that the search line 62, with the brightness of the average brightness maximum value 75 that, among the values of the average brightness 70, is the only average brightness maximum value 75 with the ratio of its value to the average brightness average value 71 equal to or larger than the predetermined value, is detected (step ST206)

Figure 13:
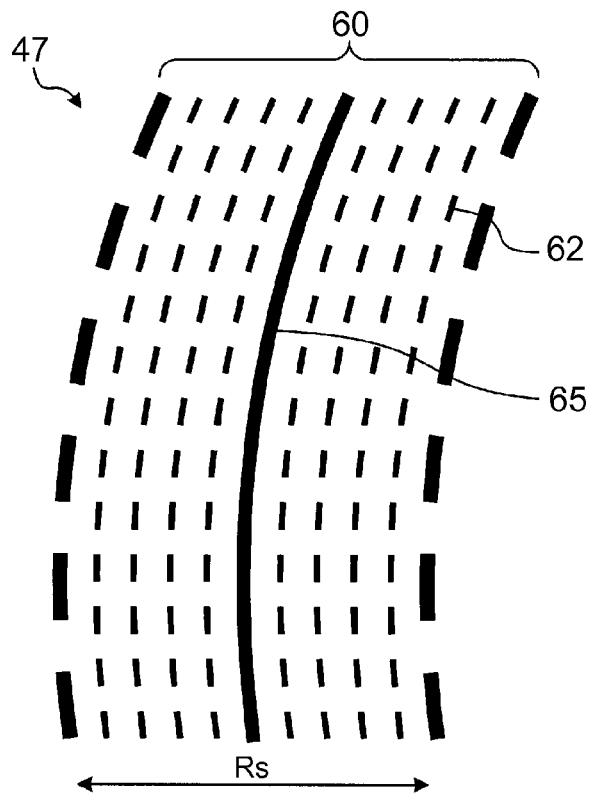
FIG. 13 is a diagram showing a white line candidate.

FIG. 13 is a diagram showing a white line candidate. If one of the search lines 62 has the average brightness 70 that is the average brightness maximum value 75 and the brightness of that average brightness maximum value 75 is equal to or larger than the average brightness average value 71 by the predetermined value, the search line 62 is set as a white line candidate line 65 that is a lane boundary marking line candidate used to estimate the low-reliability white line 47. That is, the lane parameter re-estimation unit 37 compares among a plurality of pieces of search line brightness information to determine whether there is the most reliable search line 62, which is the search line 62 that can be used as the white line candidate line 65 for estimating the low-reliability white line 47, among the plurality of search lines 62. If it is determined as a result of this determination that there is the most reliable search line 62 that can be used as the white line candidate line 65, the lane parameter re-estimation unit 37 selects the search line 62 as the white line candidate line 65 that is a lane boundary marking line candidate line. If it is determined that there is not the most reliable search line 62 that can be used as the white line candidate line 65, the lane parameter re-estimation unit 37 does not select any of the plurality of search lines 62 as the white line candidate line 65.

The lane parameter re-estimation unit 37 performs the processing described above to determine whether there is the search line 62 which can be selected as the white line candidate line 65 and the average brightness 70 of which is the maximum and the local maximum. If it is determined as a result of this determination that the search line 62, with the brightness of the average brightness maximum value 75 that, among the values of the average brightness 70, is the only average brightness maximum value 75 with the ratio of its value to the average brightness average value 71 equal to or larger than the predetermined value, is detected (step ST206) and, as a result, it is determined that there is the search line 62 the average brightness 70 of which is the maximum and the local maximum (Yes in step ST111), the detection flag is turned on (step ST112). That is, if it is determined that there is the search line 62 the average brightness 70 of which is the maximum and the local maximum and, as a result, this search line 62 is selected as the white line candidate line 65, the detection flag corresponding to the low-reliability white line 47 is turned on.

After the detection flag corresponding to the low-reliability white line 47 is turned on, the ECU 20 outputs the lane parameters (step ST113). That is, the lane parameters for the high-reliability white line 46 and the lane parameters for the low-reliability white line 47 are output. Of these lane parameters, the lane parameters, generated by adding the offset amount of the white line candidate line 65 for the high-reliability white line 46 to the lane parameters for the high-reliability white line 46, are output as the parameters for the low-reliability white line 47. By outputting the lane parameters for the white line 45 on both right and left sides in this manner, the lane boundary marking line detection device 2 outputs the detection result of the white lines 45 on both right and left sides of the lane 41 in the image 16 captured by the camera 15. The lane parameters for the white lines 45 output from the lane boundary marking line detection device 2 are used, as necessary, for other control operations during the travel control of the vehicle 1, for example, to increase the safety of vehicle travel and to support a driver in the driving operation.

Similarly, if the white line 45 is detected on both right and left sides (Yes in step ST108), the ECU 20 outputs the lane parameters (step ST113). In this case, because the estimation of the lane parameters for the white line 45 on both right and left sides of the lane 41, in which the vehicle travels, is already completed, the ECU 20 outputs the lane parameters for the white line 45 on both right and left sides.

On the other hand, if it is determined that the search line 62, with the brightness of the average brightness maximum value 75 that, among the values of the average brightness 70, is the only average brightness maximum value 75 with the ratio of its value to the average brightness average value 71 equal to or larger than the predetermined value, is not detected (step ST204) and, as a result, it is determined that there is not the search line 62 the average brightness 70 of which is the maximum and the local maximum (No in step ST111), the detection flag is maintained (step ST114). That is, if it is determined that there is not the search line 62 the average brightness 70 of which is the maximum and the local maximum and, as a result, any search line 62 is not selected as the white line candidate line 65, the detection flag corresponding to the low-reliability white line 47 remains off.

The ECU 20 outputs the lane parameters also when the white line candidate line 65 is not selected and the detection flag is maintained as in the case described above (step ST113). In this case, the lane parameters only for the high-reliability white line 46 are output. That is, if the white line candidate line 65 for estimating the low-reliability white line 47 is not selected from the plurality of search lines 62, it becomes difficult to accurately estimate the lane parameters for the low-reliability white line 47. Therefore, if the white line candidate line 65 is not selected and, as a result, the detection flag corresponding to the low-reliability white line 47 remains off, the ECU 20 outputs the lane parameters, not for the low-reliability white line 47, but only for the high-reliability white line 46.

The lane boundary marking line detection device 2 in the embodiment described above detects the white lines 45 of the road 40 from the image 16 captured by the camera 15. If the detection reliability of one of the white lines 45 on the right and left sides is low, the lane boundary marking line detection device 2 sets a plurality of search lines 62 and compares the search line brightness information among the search lines 62 to determine whether any of the plurality of search lines 62 can be used as the white line candidate line 65. If it is determined as a result of this determination that there is not the search line 62 that is most reliable as the white line candidate line 65, the lane boundary marking line detection device 2 does not select any of the search lines 62 as the white line candidate line 65, thus reducing the possibility of correcting the white line 45 when its detection reliability is low. As a result, the possibility of incorrect detection is reduced.

Modification

When selecting the white line candidate line 65 from a plurality of search lines 62, the lane boundary marking line detection device 2 in the embodiment described above determines whether there is the white line candidate line 65 only from the search lines 62 that are set based on the high-reliability white line 46 included in the image 16. Instead of this, another method that increases the detection accuracy of the low-reliability white line 47 may be used. To increase the detection accuracy of the low-reliability white line 47, the low-reliability white line 47 may also be estimated, for example, by dividing the search lines 62 into a plurality of areas and, from each of those areas, selecting the white line candidate line 65 and by grouping the search lines 62, each selected as the white line candidate line 65, into one white line candidate line for estimating the low-reliability white line 47.

Figure 14:
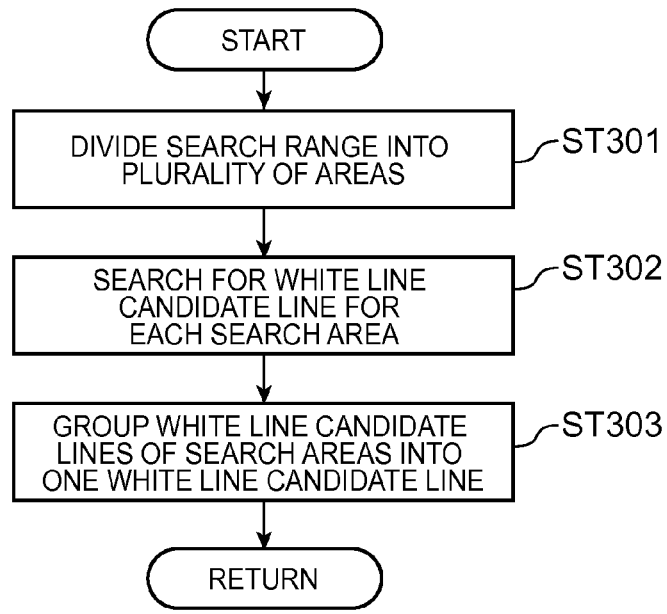
FIG. 14 is a flowchart showing the processing procedure for estimating a low-reliability white line by dividing search lines into a plurality of areas.
Figure 15:
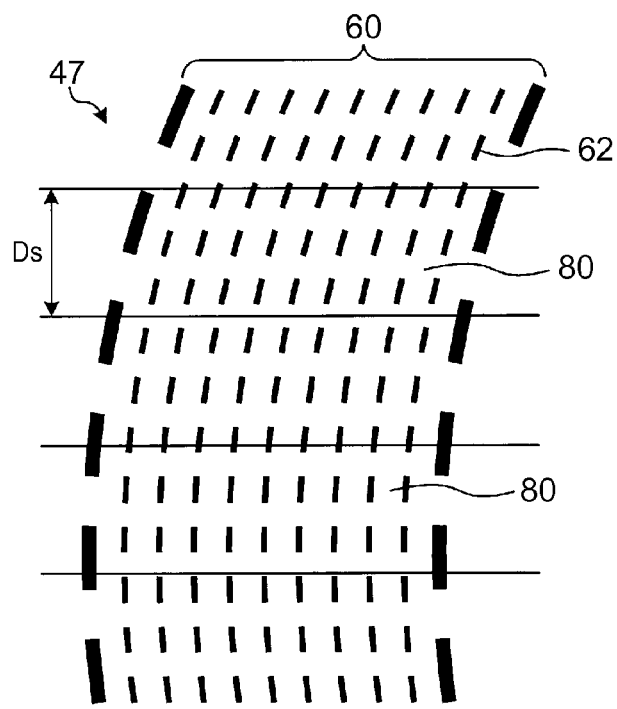
FIG. 15 is a diagram showing the detection of a low-reliability white line by setting a division distance.

FIG. 14 is a flowchart showing the processing procedure for estimating the low-reliability white line by dividing the search lines into a plurality of areas. FIG. 15 is a diagram showing the detection of the low-reliability white line by setting a division distance. To increase the detection accuracy of the low-reliability white line 47, the search range 60 is divided into a plurality of areas (step ST301). More specifically, as shown in FIG. 15, the range in which the lane parameter re-estimation unit 37 of the ECU 20 searches for the low-reliability white line 47 is divided into a plurality of areas, each having a predetermined division distance, in the extending direction of the search lines 62. As a result, the plurality of search lines 62 is also divided. In this manner, a plurality of divided search areas 80 is set, one for each division distance Ds.

Figure 16:
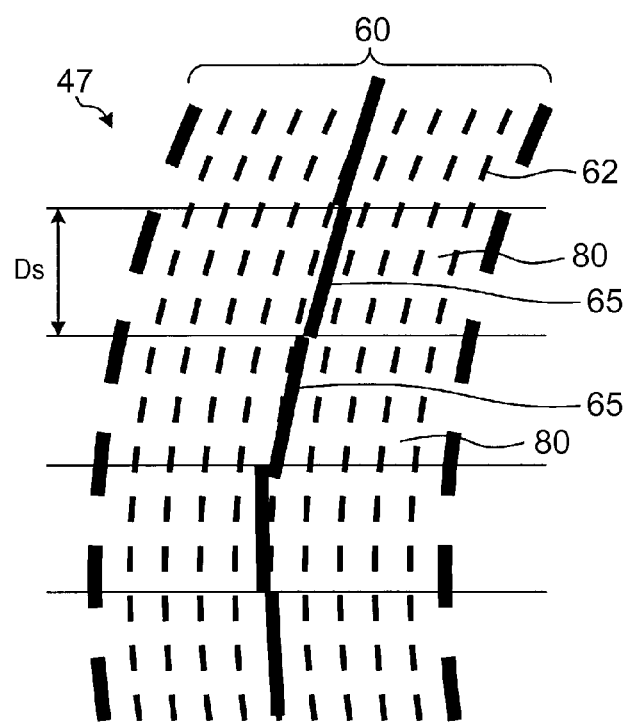
FIG. 16 is a diagram showing the state in which a white line candidate line is selected for each area.

FIG. 16 is a diagram showing the state in which a white line candidate line is selected for each area. Next, the ECU 20 searches for the white line candidate line 65 for each search area 80 (step ST302). That is, the ECU 20 calculates the average brightness 70 of the search lines 62 for each search area 80. After that, based on the calculated average brightness 70, the ECU 20 searches for the white line candidate line 65 for each search area 80 by determining whether there is the search line 62 that is most reliable as the white line candidate line 65.

Figure 17:
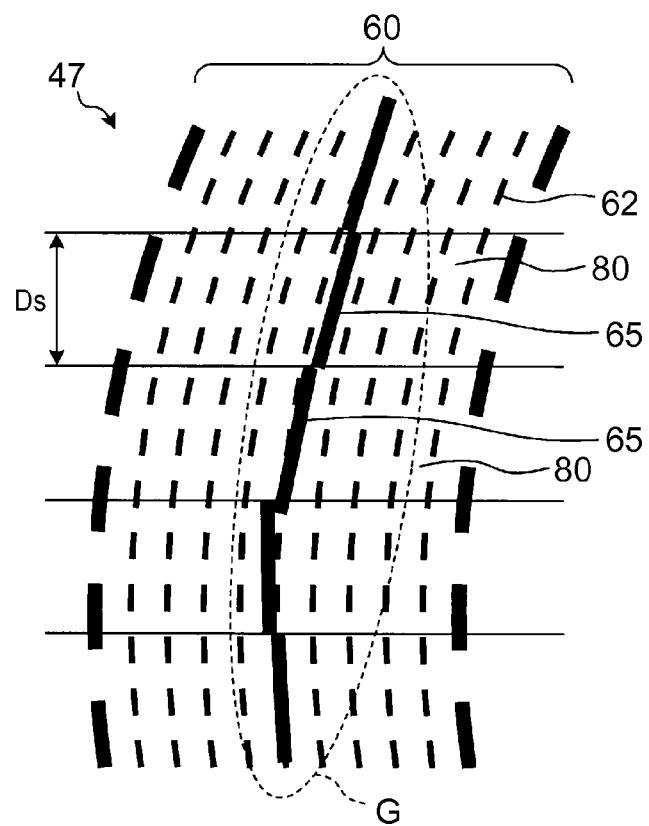
FIG. 17 is a diagram showing the grouping of search lines selected as white line candidate lines.

FIG. 17 is a diagram showing the grouping of search lines each selected as the white line candidate line. Next, the ECU 20 groups the white line candidate lines 65 of the search areas 80 into one white line candidate line as a group G (step ST303). To group the white line candidates 65 into one white line, the ECU 20 first compares the vehicle-width-direction positions of the search lines 62 each of which is selected in the search area 80 as the white line candidate line 65 and which are included in the search areas 80 that neighbor in the extending direction of the search lines 62. That is, the ECU 20 determines whether the horizontal distance between the search lines 62, each selected as the white line candidate line 65 in the each of the neighboring search areas 80, is included in a predetermined range. If it is determined as a result of this determination that the horizontal distance between the search lines 62, each selected as the white line candidate line 65 in the each of the neighboring search areas 80, is included in the predetermined range, the ECU 20 groups these search lines 62 into one lane boundary marking line candidate. On the other hand, if the horizontal distance between of the search lines 62 of the areas neighboring in the extending direction of the search lines 62 are not in the predetermined range, the ECU 20 does not group these search lines 62 into one lane boundary marking line candidate.

It is desirable that the predetermined distance in the horizontal direction between the search lines 62, which is used for determining whether to group the search lines 62 into one, be set in advance and stored in the storage unit of the ECU 20. The predetermined range mentioned here, such as the width corresponding to the width of the white line 45, refers to a range in which the search lines 62, each selected as the white line candidate line 65 in each of the neighboring search areas 80, are determined to indicate one white line 45.

As described above, the ECU 20 selects the search lines 62, each of which is highly reliable as the white line candidate line 65, from the plurality of search areas 80. If these search lines are positioned in the predetermined range, the ECU 20 groups these selected search lines 62 into one white line candidate. This makes it easy to detect a line, which can be determined as the white line 45, from the lines on the road 40 even when the white line is a scraped line. As a result, the ECU 20 reliably reduces the possibility of correcting the white line 45 when its detection reliability is low and reduces the possibility of incorrect detection.

If one of the white lines 45 on the right and left sides of the lane 41 is low in detection reliability, the lane boundary marking line detection device 2 in the embodiment described above sets a plurality of search lines 62 based on the high-reliability white line 46. Instead of this, the lane boundary marking line detection device 2 may set the search lines 62 based on an object other than the high-reliability white line 46.

Figure 18:
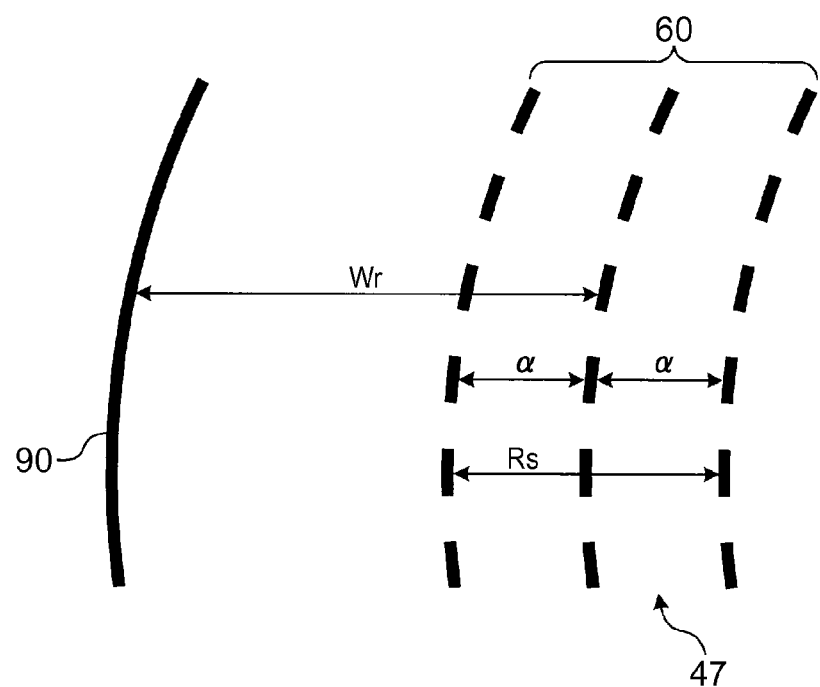
FIG. 18 is a diagram showing the setting of search lines based on curbstones.

FIG. 18 is a diagram showing the setting of search lines based on curbstones. To set the search lines 62 based on an object other than the high-reliability white line 46, the shape information about a solid lane boundary, such as curbstones 90 positioned at the end in the vehicle width direction on the road surface on which the vehicle travels, may be used for setting the search lines 62. As the lane boundary, an object other than the curbstones 90 may be used. For example, the shoulder of the road positioned at the end of the road 40 or the guardrails or sidewalls at the end of the road 40 may be used as the lane boundary for setting the search lines 62. In the description below, the curbstones 90 are used as the lane boundary.

FIG. 19 is a flowchart showing the processing procedure for setting search lines based on curbstones. Also when the curbstones 90 are used to set the search lines 62, the ECU 20 first uses the image acquisition unit 25 to acquire the image 16 captured by the camera 15 (step ST101) and, based on the acquired image 16, determines whether there are the curbstones 90 (step ST401). That is, the lane parameter re-estimation unit 37 of the ECU 20 determines whether there are the curbstones 90 at the horizontal ends of the road 40 on which the vehicle travels, based on the image 16 captured by the image acquisition unit 25. If it is determined as a result of this determination that there are no the curbstones 90 (No in step ST401), the ECU 20 detects the edge points included in the image 16 captured by the image acquisition unit 25 and, based on the detected edge points, detects the white lines 45.

On the other hand, if it is determined that there are curbstones 90 (Yes in step ST401), the ECU 20 detects the curbstones 90 (step ST402). The curbstones 90 are detected by a known method. For example, the ECU 20 uses a stereo camera or a laser to detect the shape of the curbstones 90 including the solid shape of the curbstones 90 and then detects the lane parameters obtained from the curbstones 90. That is, the ECU 20 estimates the lane parameters, such as the curvature, a change in the curvature, the offset, and the yaw angle, based on the shape of the curbstones 90.

After detecting the curbstones 90, the ECU 20 creates a plurality of search lines 62 next (step ST403). That is, the ECU 20 sets the search range 60, in which the low-reliability white line 47 is searched for, based on the lane parameters estimated based on the shape of the curbstones 90. This search range 60 is set in the same manner as when the lane boundary marking line detection device 2 in the embodiment sets the search range 60 based on the high-reliability white line 46. That is, the lane parameter re-estimation unit 37 sets a white line search range Rs as the search range 60. This white line search range Rs is a range beginning at the position, determined by shifting the position of the curbstones 90 to the low-reliability white line 47 side by the lane width Wr and then shifting that position in the direction closer to the curbstones 90 by (lane width Wr×α), and ending at the position determined by shifting the position of the curbstones 90 to the low-reliability white line 47 side by the lane width Wr and then shifting that position in the direction away from the curbstones 90 by (lane width Wr×α). After the search range 60 is set, a plurality of search lines 62 is set at horizontally different positions in the search range 60.

By creating the plurality of search lines 62 based on the curbstones 90 and detecting the white lines 45 in this manner, the white lines 45 can be detected based on the curbstones 90 even when neither the white line 45 on the left side nor the white line 45 on the right side is detected. For example, when the curbstones 90 positioned at the left end of the road 40 on which the vehicle travels are detected, the difference between the detected horizontal position of the curbstones 90 and the present horizontal position of the white line 45 positioned at the left end of the lane 41 is determined based on the past detection result of the curbstones 90 and the lane parameters for the white line 45 positioned at the left end of the lane 41. Then, the search range 60 is set based on the determined difference. After the search range 60 in which the white line 45 positioned at the left end is searched for is set, the ECU 20 sets the plurality of search lines 62 and, based on these search lines 62, estimates the white line 45 positioned at the left end (steps ST110 to ST114).

After the white line 45 positioned at the left end of the lane 41 is estimated as described above, the ECU 20 sets the search range 60, in which the white line 45 at the right end of the lane 41 is searched for, based on the lane parameters for the estimated white line 45. In addition, the ECU 20 sets the plurality of search lines 62 in this search range 60 and, based on these search lines 62, estimates the white line 45 positioned at the right end of the lane 41 (steps ST110 to ST114).

The ability to detect the white lines 45 based on a lane boundary, such as the curbstones 90, as described above allows the white lines 45 to be detected based on a plurality of detection criteria. This ability increases the detection accuracy of the white lines 45 and reduces the possibility of incorrect detection more reliably. In addition, even when the detection reliability of the white lines 45 at both right end and left end is low, the white lines 45 can be detected based on a lane boundary such as the curbstones 90. Furthermore, by detecting the white line 45 based on a lane boundary such as the curbstones 90, the lane boundary marking line on the other side can be searched for based on the detection result of a solid lane boundary, such as the shoulder of the road, the guardrail, or the sidewalk, even in the travel environment in which there is no lane boundary marking line such as the white line 45 at the end of the road surface.

The lane boundary marking line detection device 2 described above detects the white lines 45 positioned at both right and left ends of the lane 41 in which the vehicle travels. Instead, the lane boundary marking line detection device 2 may also detect the white line 45 other than those of the lane 41 in which the vehicle travels. For example, after detecting the white lines 45 of the lane 41 in which the vehicle travels, the lane boundary marking line detection device 2 may detect the white line 45 of the lane 41 neighboring to the lane 41 in which the vehicle travels, based on the lane parameters for the detected white line 45. This allows the state of the neighboring lane 41 to be recognized, realizing suitable control for increasing the safety of travel of the vehicle 1 and for supporting a driver in the driving operation based on a wider range of information.

What is claimed is:

1. A lane boundary marking line detection device comprising:
    an imaging device configured to capture an area in front of a vehicle;
    a lane boundary detection unit configured to detect a first lane boundary and a second lane boundary based on image information in an imaging area captured by the imaging device, the first lane boundary and the second lane boundary being positioned on a road surface on which the vehicle travels, and the second lane boundary being positioned on the road surface on an opposite side of the first lane boundary across the vehicle in a vehicle width direction; and
    a lane boundary marking line search unit configured to search for a lane boundary marking line on the road surface on the opposite side based on a position of the first lane boundary, wherein the lane boundary marking line search unit is configured to set search lines on the road surface on the opposite side based on shape information on the first lane boundary, the search lines being positioned at positions different from each other in the vehicle width direction in the lane, the lane boundary marking line search unit is configured to acquire search line brightness information based on the image information, the search line brightness information being brightness information on each of the search lines, the lane boundary marking line search unit is configured to determine, by comparing the search line brightness information of the search lines with each other, whether there is the search line that is one of the search lines and is most probable as the search line used as a lane boundary making line candidate, the lane boundary marking line search unit is configured to, when it is determined that there is the search line that is most probable as the lane boundary marking line, select the search line as a lane boundary marking line candidate line, and the lane boundary marking line search unit is configured not to, when it is not determined that there is the search line that is most probable as the lane boundary marking line, select any of the search lines as the lane boundary marking line candidate line.

2. The lane boundary marking line detection device according to claim 1, wherein
the lane boundary marking line search unit is configured to set the search lines based on shape information on a solid lane boundary positioned at an end of the road surface on which the vehicle travels, in the vehicle width direction.

3. The lane boundary marking line detection device according to claim 1, wherein
the lane boundary marking line search unit is configured to divide each of the search lines into a plurality of areas in an extending direction of the search lines and to determine whether there is the search line that is most probable as the lane boundary marking line candidate line in each of the areas, and
the lane boundary marking line search unit is configured to, when a vehicle-width-direction distance between the search lines of areas neighboring in the extending direction is in a predetermined range, group the search lines of the areas neighboring in the extending direction into one lane boundary marking line candidate, each of the search lines being selected in a corresponding one of the areas as the lane boundary marking line candidate line.

4. The lane boundary marking line detection device according to claim 1, wherein
the search line that is most probable is a search line having a maximum value and a local maximum value of average brightness among the search lines.

5. The lane boundary marking line detection device according to claim 1, further comprising:
a lane parameter estimation unit configured to estimate parameters for the road surface on which the vehicle travels, based on shape information on the first lane boundary and the second lane boundary, wherein
the lane boundary marking line search unit is configured to, when the lane parameter estimation unit does not estimate the parameters for at least one of the first lane boundary and the second lane boundary, set the search lines based on the shape information on the first lane boundary.

6. An electronic control device comprising:
a lane boundary detection unit configured to detect a first lane boundary and a second lane boundary based on image information on an area in front of a vehicle, the first lane boundary and the second lane boundary being positioned on a road surface on which the vehicle travels, and the second lane boundary being positioned on the road surface on an opposite side of the first lane boundary across the vehicle in a vehicle width direction; and
a lane boundary marking line search unit configured to search for a lane boundary marking line on the road surface on the opposite side based on a position of the first lane boundary, wherein
the lane boundary marking line search unit is configured to set search lines on the road surface on the opposite side based on shape information on the first lane boundary, the search lines being positioned at positions different from each other in the vehicle width direction in the lane,
the lane boundary marking line search unit is configured to acquire search line brightness information based on the image information, the search line brightness information being brightness information on each of the search lines,
the lane boundary marking line search unit is configured to select a search line having a maximum value and a local maximum value of average brightness among the search lines as a lane boundary marking line candidate line based on the search line brightness information, and
the lane boundary marking line search unit is configured not to, when there is not the search line having the maximum value and the local maximum value of average brightness, select any of the search lines as the lane boundary marking line candidate line.

7. The electronic control device according to claim 6, wherein
the lane boundary marking line search unit is configured to set the search lines based on shape information on a solid lane boundary positioned at an end of the road surface on which the vehicle travels, in the vehicle width direction.

8. The electronic control device according to claim 6, wherein
the lane boundary marking line search unit is configured to divide each of the search lines into a plurality of areas in an extending direction of the search lines and to determine whether there is the search line having the maximum value and the local maximum value of average brightness in each of the areas, and
the lane boundary marking line search unit is configured to, when a vehicle-width-direction distance between the search lines of areas neighboring in the extending direction is in a predetermined range, group the search lines of the areas neighboring in the extending direction into one lane boundary marking line candidate, each of the search lines being selected in a corresponding one of the areas as the lane boundary marking line candidate line.

9. The electronic control device according to claim 6, further comprising:
a lane parameter estimation unit configured to estimate parameters for the road surface on which the vehicle travels, based on shape information on the first lane boundary and the second lane boundary, wherein
the lane boundary marking line search unit is configured to, when the lane parameter estimation unit does not estimate the parameters for at least one of the first lane boundary and the second lane boundary, set the search lines based on the shape information on the first lane boundary.

10. The electronic control device according to claim 9, wherein the electronic control device is configured to, when the lane parameter estimation unit has estimated the parameters for the first lane boundary and the parameters for the second lane boundary, output the parameters for the first lane boundary and the parameters for the second lane boundary as lane parameters.

* * * * *